(12) United States Patent
Hannon et al.

(10) Patent No.: US 6,525,299 B2
(45) Date of Patent: Feb. 25, 2003

(54) ELECTRIC GARLIC COOKER

(76) Inventors: Georgia A. Hannon, 5611 381 Ave., Burlington, WI (US) 53105; Todd J. Hannon, 5611 381 Ave., Burlington, WI (US) 53105

( * ) Notice: Subject to any disclaimer, the term of this patent is extended or adjusted under 35 U.S.C. 154(b) by 0 days.

(21) Appl. No.: 09/850,829

(22) Filed: May 8, 2001

(65) Prior Publication Data

US 2002/0185486 A1 Dec. 12, 2002

(51) Int. Cl.$^7$ .................................................. F27D 11/00
(52) U.S. Cl. ...................... 219/436; 219/385; 219/391; 219/429; 99/440; 99/426
(58) Field of Search .................... 219/385, 386, 219/391–392, 436, 429, 438; 99/440, 426

(56) References Cited

U.S. PATENT DOCUMENTS

| | | | |
|---|---|---|---|
| 2,425,199 A | 8/1947 | Navon | 99/440 |
| 3,963,402 A | 6/1976 | Berta | 425/299 |
| 4,066,797 A | 1/1978 | McNair | 426/307 |
| 4,617,860 A | * 10/1986 | Blaylock | 99/415 |
| 5,363,748 A | * 11/1994 | Boehm et al. | 99/372 |
| 5,523,104 A | 6/1996 | Kirk | 426/523 |
| 5,809,871 A | * 9/1998 | Arathoon | 99/380 |
| 6,026,734 A | * 2/2000 | Dadez | 99/345 |
| 6,150,635 A | * 11/2000 | Hannon et al. | 219/386 |

* cited by examiner

*Primary Examiner*—Teresa Walberg
*Assistant Examiner*—Shawntina T. Fuqua

(57) ABSTRACT

An electrical cooking device (10) for a bulb or more of garlic including a lower bowl-like cooking plate (22) with circular peripheral walls (46) extending upward having a annular beveled rim (32) and an upper domed cooking plate (20) having a recessed annular beveled rim (34) when in a closed position align in nestable cooperation to form a cooking chamber (30) in which one or more bulbs of garlic can be cooked quickly and efficiently.

4 Claims, 7 Drawing Sheets

ELECTRIC GARLIC COOKER

BACKGROUND

1. Field of Invention

This invention is a device for cooking foodstuffs, in particular it relates to an electrical cooker that roasts garlic.

2. Description of Prior Art

Garlic is one of the oldest and most popular flavoring herbs in the world having been used as a food and medicine for centuries by all cultures. Over 200 million pounds of garlic are produced annually in the United States with its use having quadrupled in the past twenty-five years. It is a very pungent herb that when roasted the cloves soften and the sugars become concentrated creating a mild and nutty flavor. It is very popular as it becomes spreadable and its unique taste enhances many foods.

Roasted garlic is a favorite appetizer both in homes and restaurants and there are many recipes that call for its addition.

Presently the best method to roast a bulb of garlic is in a roasting container generally made of clay or ceramic or simply wrapping it in aluminum foil. Usually oil is added and then it is placed in a conventional oven at 350 to 400 degrees for approximately 45 minutes or if a lower temperature is used the cooking time must be increased. This procedure is not only time prohibitive but also wastes large amounts of energy heating a conventional oven. Because of this most people will not bother to roast a single bulb.

U.S. Pat. No. 6,026,734 to Dadez (2000) discloses a garlic roaster comprised of two parts, a top and bottom. The top having a receptacle in which a basting material is added and enters and bastes the food located on the base plate during the roasting operation. It still must be placed in an oven for the standard baking time. This does not solve the problem of the lengthy cooking time or the excessive energy waste. Therefore there is a need for an appliance that will cook one or more bulbs of garlic quickly and easily with little waste of energy.

OBJECTS AND ADVANTAGES

Accordingly, the principle object of the invention is to overcome the disadvantages mentioned by providing an electrical cooker that cooks the garlic fast and uses only a small amount of energy to replace what before took large amounts in a conventional oven.

Another object of the invention is to eliminate the excess heat put into a room by a conventional oven.

A further object of the invention is to provide a safe and convenient method of roasting garlic that can be utilized in any home.

SUMMARY

These and other objects of the present invention are included in the preferred embodiment of a cooking device described herein comprised of a bowl-like lower cooking plate having a top planar surface surrounding a raised annular beveled rim adjacent a central circular recessed region and a domed upper cooking plate having a bottom planar surface surrounding a recessed annular beveled rim extending around a deeper central recessed dome area. These cooking plates when closed align in nestable cooperation to form a cooking chamber in which the garlic is placed. A heating element is located in close proximity to the cooking plates that provides heat to the cooking chamber and cooks the garlic within. A heat resistant housing surrounds the cooking plates in a somewhat decorative design. The apparatus may also contain multiple plate and cover combinations that provide surfaces for additional bulbs to be cooked simultaneously which may be advantageously used, for example, in restaurants.

DRAWINGS

| Reference Numerals | |
|---|---|
| 10 cooking device | 12 base unit |
| 14 upper unit | 16 base |
| 18 dial | 20 upper cooking plate |
| 22 lower cooking plate | 24 upper housing |
| 26 lower housing | 28 heating element |
| 30 cooking chamber | 32 lower cooking plate rim |
| 34 upper cooking plate rim | 36 hinge |
| 38 screws | 40 base cover |
| 42 timer control | 44 feet |
| 46 cord | |

DRAWINGS

Figures

DETAILED DESCRIPTION

Figure 1:
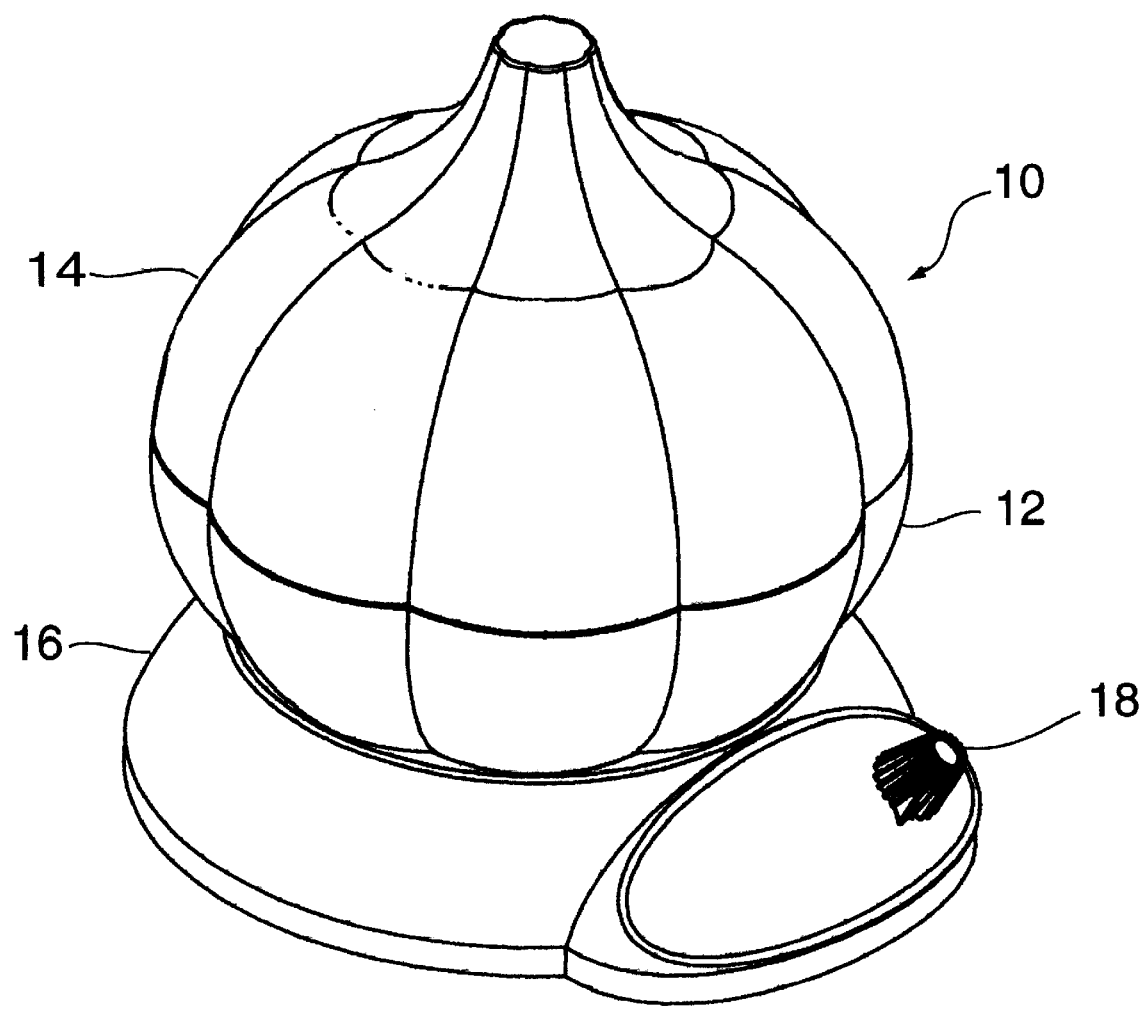
FIG. 1 is a perspective view of a preferred embodiment of the device of the present invention in a closed position.
Figure 6:
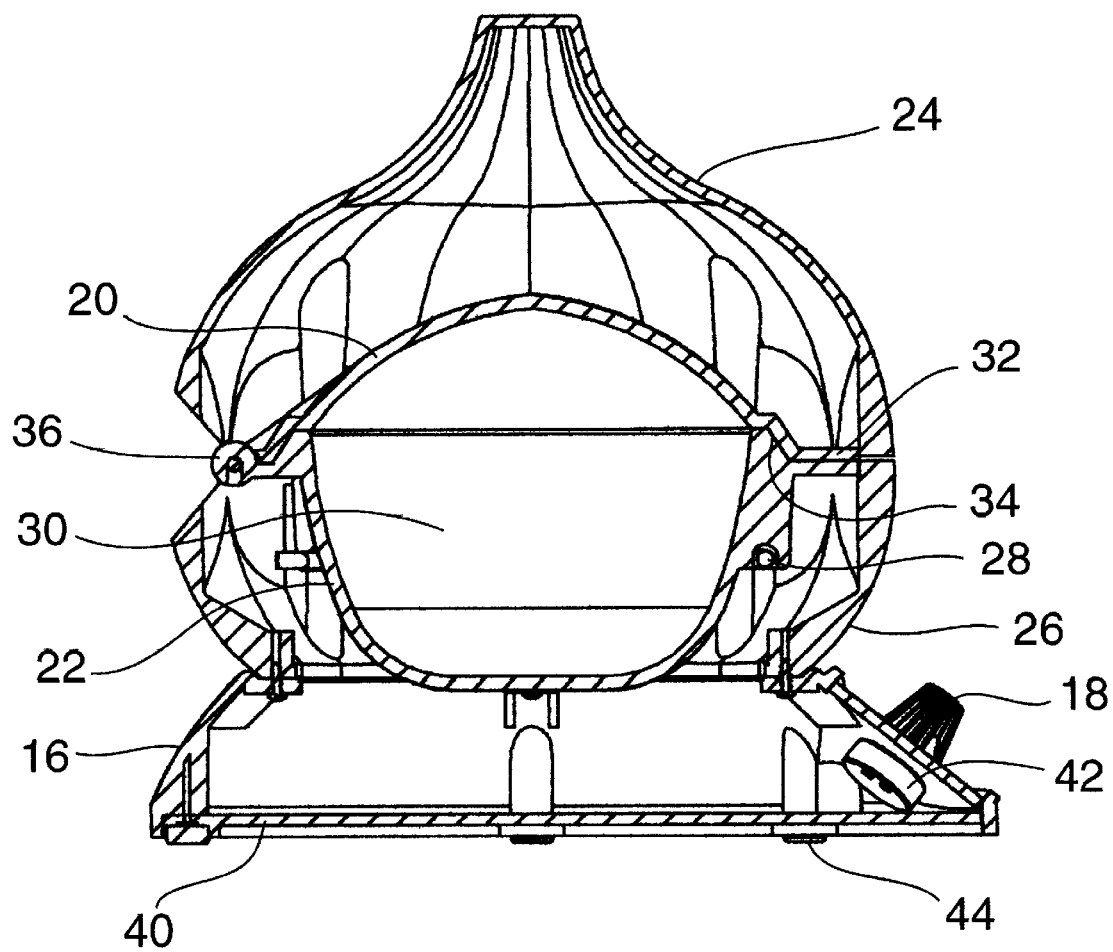
FIG. 6 is a sectional view of FIG. 1.
Figure 7:
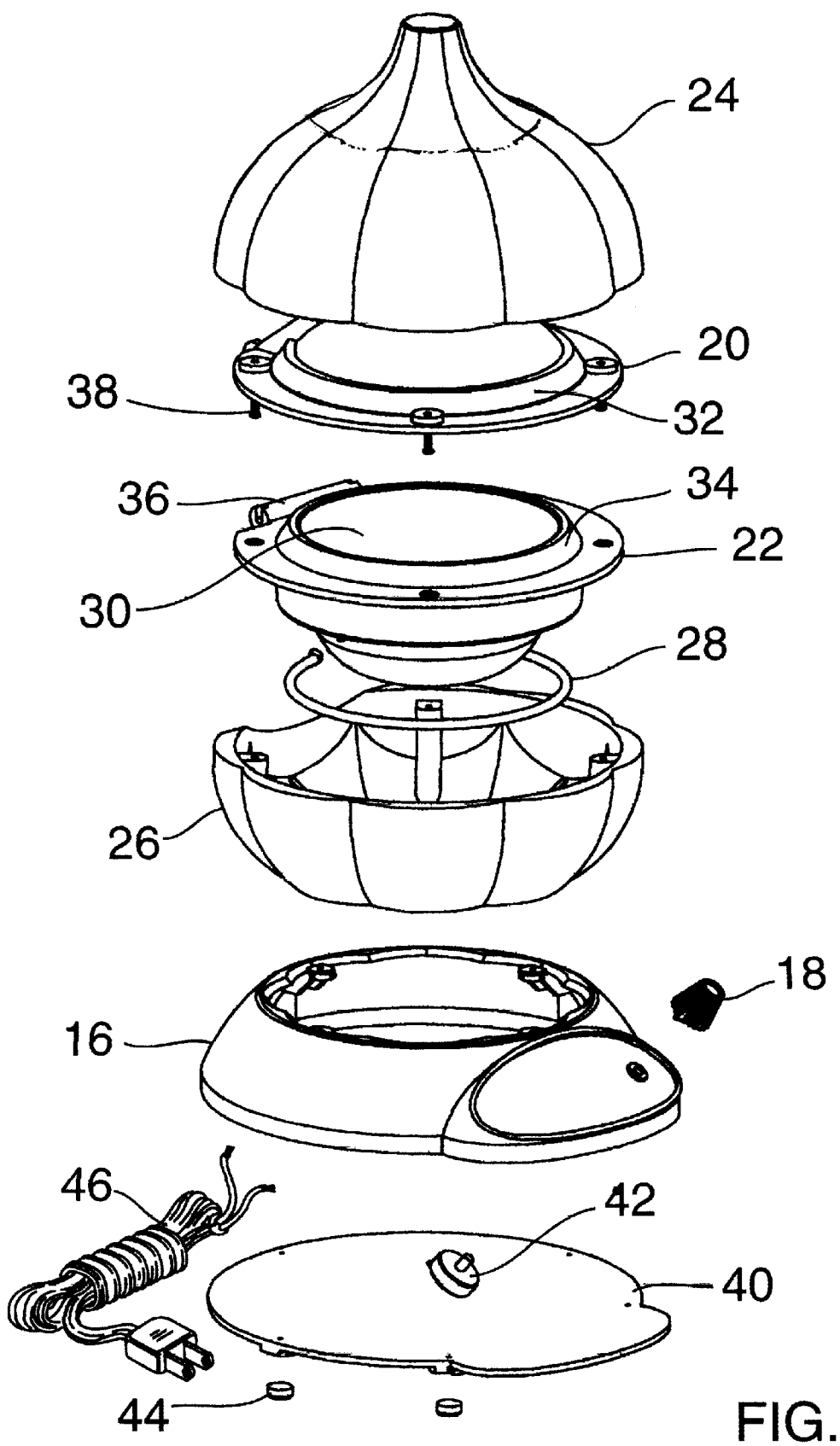
FIG. 7 is an exploded view of the device of FIG. 1.

FIG. 1 illustrates a first embodiment of a cooking device constructed in accordance with the present invention. The apparatus 10 is somewhat decoratively shaped, includes a base unit indicated at 12 and an upper unit indicated at 14. Base 16 stabilizes the upper unit 12 and base unit 14 and houses timer 42 (FIGS. 6 and 7) and timer dial 18 and is covered by base cover 40 (FIGS. 6 and 7).

Figure 2:
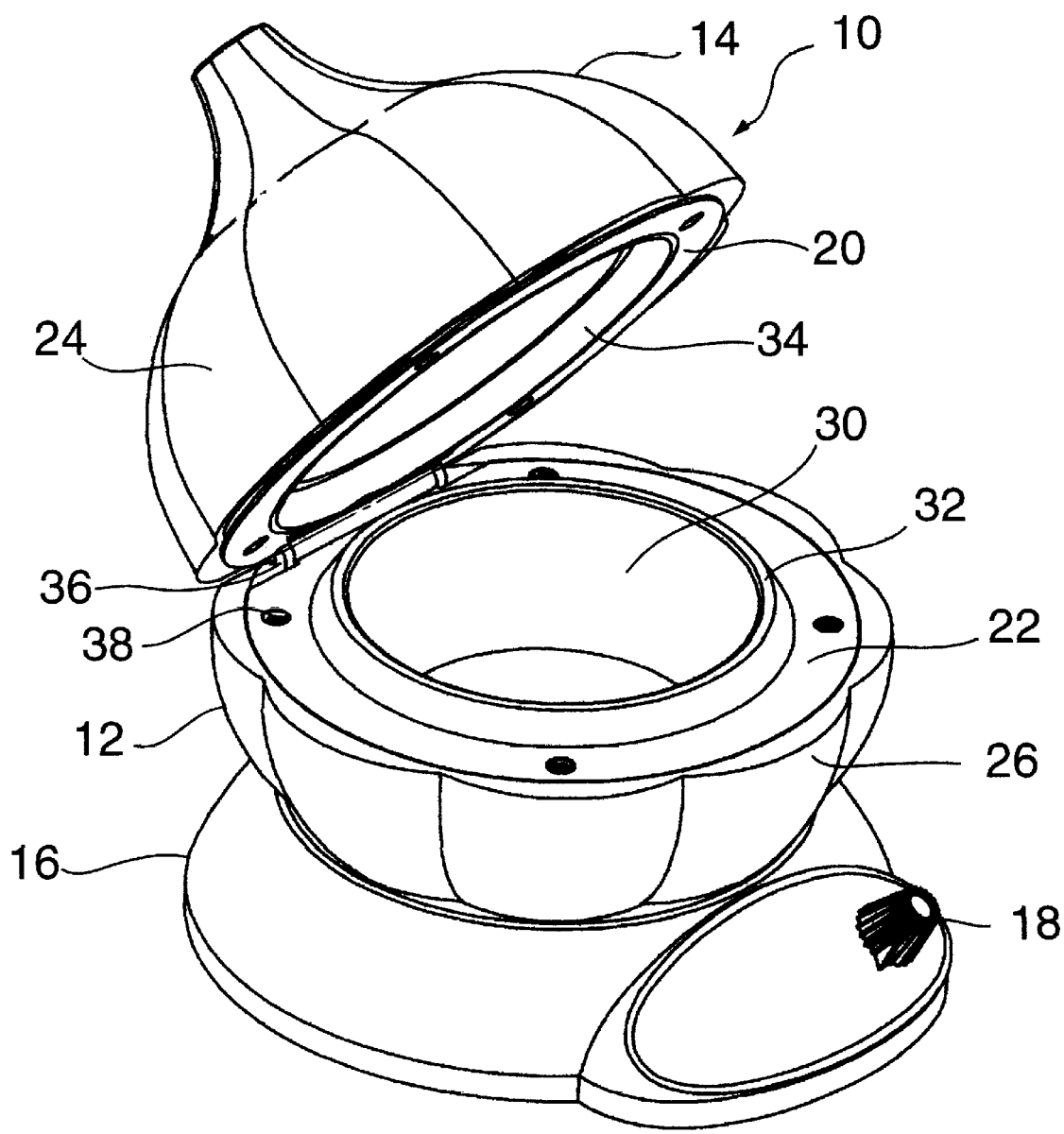
FIG. 2 is a perspective view of the device of FIG. 1 in an open position.
Figure 3:
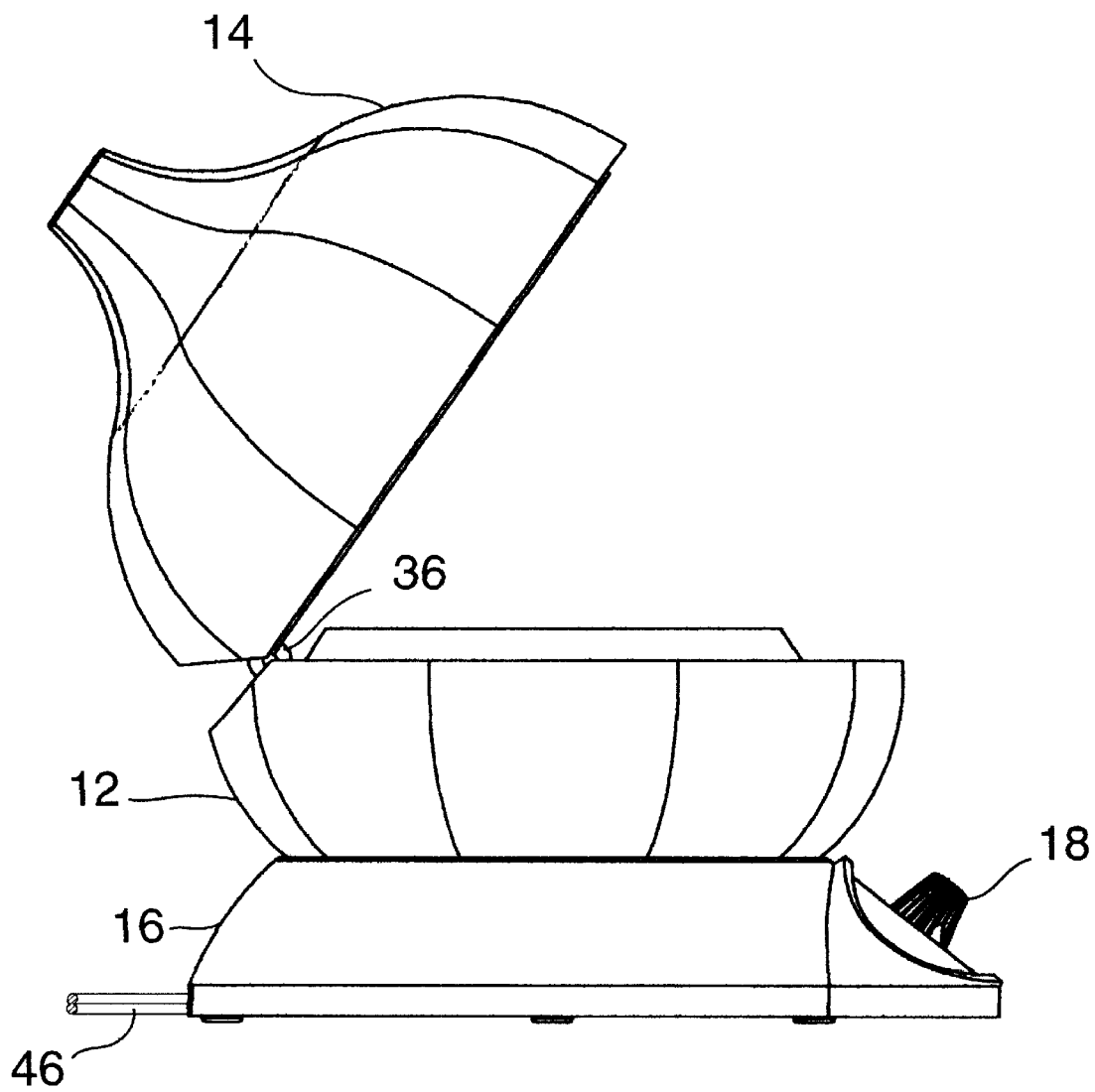
FIG. 3 is a side elevational view of FIG. 1 in an open position.
Figure 4:
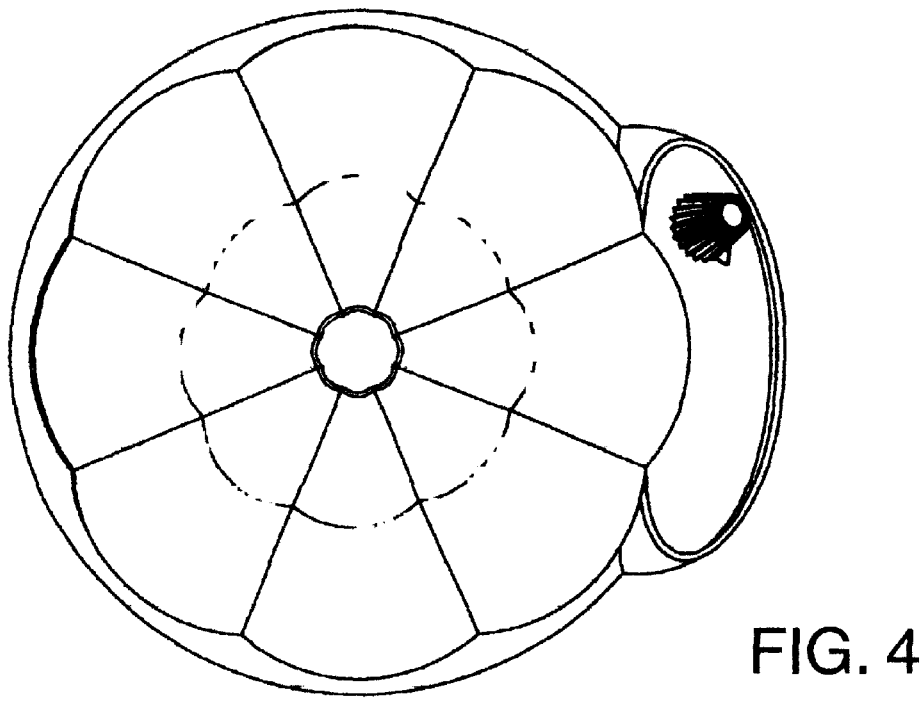
FIG. 4 is a top planar view.
Figure 5:
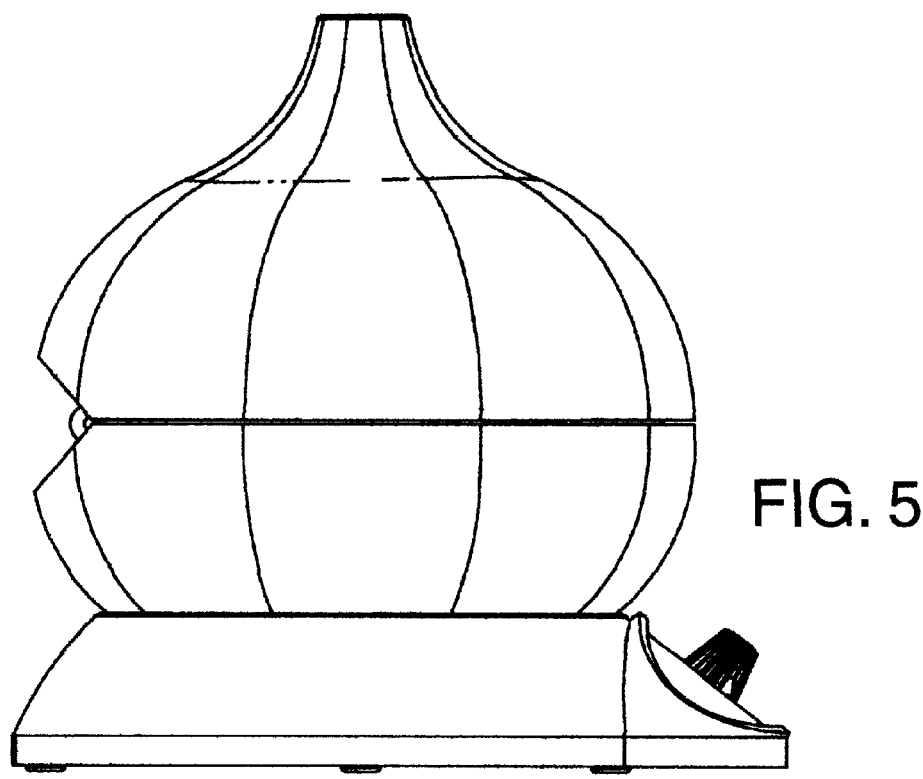
FIG. 5 is a side elevational view of FIG. 1 in a closed position.

Referring to FIG. 2 the base unit 12 includes a lower housing 26 to which lower cooking plate 22 is secured by screws 38. The upper unit 14 includes an upper housing 24 to which upper cooking plate 20 is secured by screws 38. The upper unit 14 being pivotal connected by hinge 36 (FIGS. 2, 3, 6, 7) movable relative to base un 12 to a closed position in which the upper cooking plate 20 and lower cooking plate 22 form a cooking chamber 30 (FIGS. 2, 6, 7). Upper cooking plate 20 is configured with an upper cooking plate rim 34 having a substantially planar surface circumscribing an annular beveled recess and lower cooking plate 22 is configured with lower cooking plate rim 32 having a substantially planar surface circumscribing an annular beveled ridge that in a closed position overlap preventing the escape of excess heat therefrom.

Lower cooking plate 22 is bowl-shaped (FIGS. 6, 7) with circular peripheral walls 46 (FIG. 6) extending upward that adequately hold the garlic and basting material within. Upper cooking plate 20 is domed to reflect heat and allow condensation to further baste during the cooking process. Cooking plates 20 and 22 being made of heat conductive metal and coated with nonstick coating provide easy cleanup.

Device 10 includes a heating element 28 (FIGS. 6, 7) coupled to lower cooking plate 22 for supplying heat to the lower cooking plate 20 and the cooking chamber 30.

Operation

In operation, cooker 10 is placed in the open position by tilting the upper unit 14 back. A bulb of garlic to which the top has been sliced off to reveal the cloves within is placed on the lower cooking plate 22. A basting material is added i.e. olive oil over the bulb. The upper unit 14 is placed back to the closed position and the dial 18 is actuated to bring heat the cooking chamber. During cooking the compact cooking chamber 30 allows the heated upper cooking plate 20 and the lower cooking plate 22 to be disposed in close proximity to the food thereby allowing the garlic to be quickly cooked.

After the desired cooking time is expired, the timer control 42 interrupts current to the heating element 28 indicating the garlic is cooked for the desired time. The upper unit 14 is then placed in the open position (FIG. 2) and the garlic is removed from the lower cooking plate 22. Any basting material that remains within can be easily wiped clean with a paper towel.

Additional Embodiment

Figure 8:
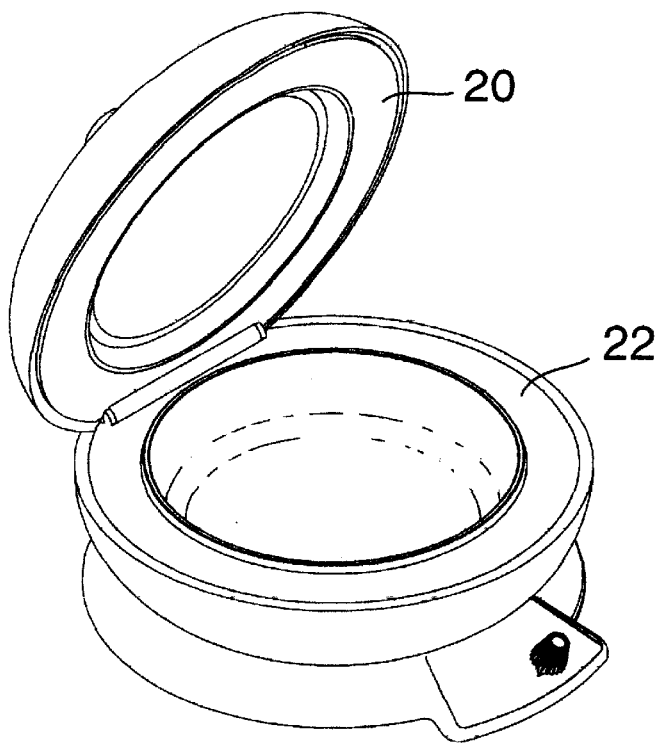
FIG. 8 is a perspective view of a first alternative embodiment of a cooking apparatus according to the principles of the present invention.

In a first alternative embodiment of the present invention (FIG. 8), the upper cooking plate 20 and the lower cooking plate 22 is enlarged to accommodate multiple cloves of garlic to be cooked simultaneously.

Figure 9:
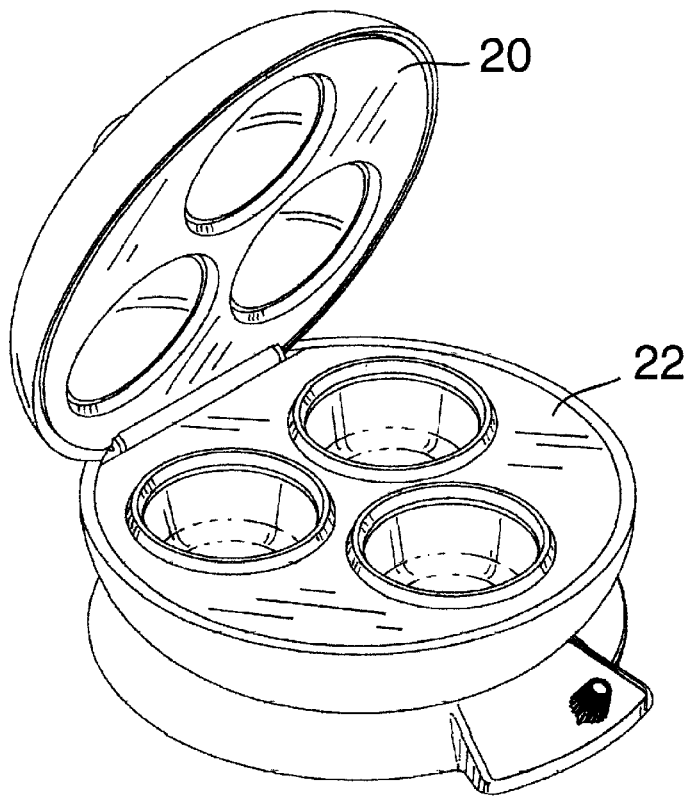
FIG. 9 is a perspective view of a second alternative embodiment of a cooking apparatus according to the principles of the present invention.

In a second alternative embodiment of the present invention (FIG. 9), multiple wells are shown, which could be any number, in the lower cooking plate 22 with corresponding domed surfaces in the upper cooking plate 20 that enable more than one clove of garlic to be cooked at the same time as might be desired in restaurants.

All embodiments may have unhinged upper units thereby allowing the upper unit to be lifted off and set back upon the base unit. Additionally, the heat resistant housing may take on any decorative configuration that enables it to affix to the cooking plates.

CONCLUSIONS, RAMIFICATIONS, AND SCOPE

The present invention provides numerous benefits and advantages. The compact electric cooker provides tremendous energy savings by eliminating the use of a conventional oven. Cooking time is substantially decreased as the heat is concentrated close to the food allowing it to cook quickly. Minimum heat is given off thereby not adding additional heat to the room. Also cleanup is easy with the nonstick interior. It will provide the wonderful aroma of roasted garlic and allow anyone at any time to safely enjoy this popular and healthy food without the previous drawbacks. While various embodiments of this invention have been described for the purposes of illustrating the manner in which the invention may be made and used. It should be understood that implementation of other variations and modifications of the invention in its various aspects will be apparent to those skilled in the art and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A device for cooking a bulb or multiple bulbs of garlic comprising: a bottom cooking plate including a top planar surface surrounding a raised annular beveled rim adjacent a central circular recessed region wherein the central circular recessed region has a circular wall that peripherally extends upward to form a bowl shaped bottom and the bottom cooking plate includes a heating element coupled thereto, a top cooking plate including a bottom planar surface surrounding a recessed annular beveled rim extending around a deeper central recessed domed area which reflects heat downward, bottom and top cooking plates being moveable to each other when in a closed position and align in a nestable configuration to form a cooking chamber which prevents the escape of excess heat and allows condensation to form when in use, the cooking chamber is of a height and width such that when in a closed position the central circular recessed region of the bottom cooking plate and the central recessed dome area of the top cooking plate are closely spaced to the garlic and basting material held within.

2. The device of claim 1, wherein the top and bottom cooking plates comprise a heat conductive material.

3. The device of claim 2, wherein a heat resistant housing is attached to the top and bottom cooking plates and has a decorative design.

4. The device of claim 3, wherein the heat resistant housing facilitates stability and houses a timer.

* * * * *